2,811,514
Patented Oct. 29, 1957

2,811,514
ADDITION PRODUCTS OF THERMALLY DEGRADED POLYETHYLENE

Hugh J. Hagemeyer, Jr., Longview, Tex., assignor to Eastman Kodak Company, Rochester, N. Y., a corporation of New Jersey No Drawing. Application December 21, 1954, Serial No. 476,845

10 Claims. (Cl. 260—94.9)

This invention relates to products obtained by the thermal degradation of polyethylene and other related high molecular weight polymeric materials in the presence of certain active organic compounds which are capable of adding to ethylenic unsaturation.

It is known that when high molecular weight linear polymers are subjected to thermal degradation, the process proceeds by a chain reaction and results in unsaturates of lower molecular weights than the starting resin. For example, the thermal degradation of polyethylene results in the formation of three principal types of monoolefinic compounds, namely, $RCH=CH_2$, $RCH=CHR_1$ and $RR_1C=CH_2$ wherein R and $R_1$ are saturated hydrocarbon groups, i. e. alkyl groups. We have now found that if the degradation is carried out in the presence of reactants capable of taking part in the free atom and/or free radical reactions, new compounds having lower molecular weights than the starting polymers are produced. These derived polymeric compounds are mixtures of individual components of varying chain lengths and not sharply separable from one another and, accordingly, the exact percentage compositions are not known with any degree of precision. However, evidence indicates that the molecular weight distribution in each instance falls within a relatively narrow range. We have found further that our derived polymeric products range from fluids and semifluids to wax-like solids, some of which are useful as synthetic detergents and emulsifying agents and others are useful as wax substitutes depending on their average molecular weights. Some others of our reaction products are 100% emulsifiable and on coating give self-polishing films.

It is, accordingly, an object of our invention to provide new thermally degraded polymer products. Another object is to provide a process for preparing these polymers. Other objects will become apparent hereinafter.

In accordance with our invention, we prepare our new derived polymer products by heating a relatively high molecular weight linear polymer, more particularly a polyethylene or an ethylene copolymer having an initial molecular weight exceeding about 6000, at a temperature of from 150°–400° C., but preferably from 270°–400° C., in the presence of an active compound which can conveniently be designated by the symbols YZ, and in the presence or not of a peroxide or peroxygen compound. Heating of the reaction mixture is continued until the desired degree of degradation of the initial polymer has been attained. It is believed that the starting polymer is first degraded to a mixture containing the above-mentioned three types of unsaturates and that such mixed products have an average shorter chain length (i. e. molecular weights ranging in the limits of from 200–4000) and containing in each individual molecule but a single ethylenic unsaturation, and that one molecule of the YZ compound then adds to each ethylenic unsaturation on adjacent carbon atoms. The reaction may be illustrated by the reaction of vinyl hydrocarbons formed by the degradation, for example, of polyethylene, only one form of degraded product being used for illustration in the following reaction Equation 1:

(I) 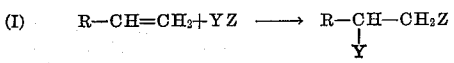

When the compound YZ is, for example, carbon tetrabromide, the reaction gives two series of isomeric products depending on whether or not a peroxide or peroxygen compound is present. In the absence of a source of oxygen or a peroxide catalyst, the reaction is believed to proceed according to the Markownikow rule illustrated by the following reaction Equation II, while in the presence of peroxide or peroxygen compounds the reaction appears to give straight chain addition products illustrated by the following Equation III:

(II) 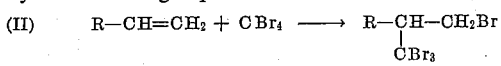

(III) 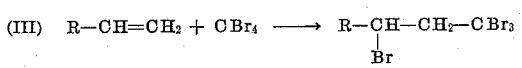

wherein R is as previously defined containing from 11 to about 200 carbon atoms. These product mixtures are not readily amenable to separation into their component parts and are generally employed per se, since they are functionally identical compounds by reason of having hydrocarbon chains in each mixture produced by our process falling within a very narrow molecular weight distribution range. The average molecular weight depends upon the extent of the degradation of the initial polymer, lower average molecular weight mixtures being obtained with increasing degradation.

In the above process, the active YZ compound need not be compatible, but better results are obtainable if there is at least partial solution of the polymer therein or vice versa. The process can also be conducted in an inert liquid medium to obtain better contact between the initial polymer and active compound or even to facilitate the degradation of the polymer chains. Suitable mediums include aromatic hydrocarbons such as, for example, benzene, toluene, xylene and mixtures thereof. Pressures at normal or above normal atmospheric pressures can be employed and in some cases less than atmospheric pressures are advantageous. A continuous process wherein the mixture is passed at uniform rate through a heated reaction zone or zones can also be employed. The proportions employed of the initial polymer and the YZ compound can vary over fairly wide limits, but preferably from about 5–50 mole equivalents (calculated on the basis of combined monomer) of the initial polymer to each mole equivalent of the YZ compound. Unreacted YZ compound, polymer residues, any solvent and any by-products can be separated from the product mixtures by methods of distillation, extraction, etc.

Suitable initial high molecular weight linear polymers that can be employed in our invention include homopolymers, copolymers and interpolymers of the polymerizable olefinic compounds containing at least one —CH=CH— group, but preferably vinyl type compounds which contain at least one $CH_2=C<$ group such as, for example, the polymers of ethylene, propylene, styrene, α-methylstyrene, dichlorostyrenes, vinyl chloride, vinyl acetate, vinyl naphthalene, vinyl phenols and polymers of α-β-aliphatic unsaturated acids, particularly the polymers of esters of these unsaturated acids such as the methyl, ethyl, propyl and butyl acrylate and methacrylate esters. Ethylene polymers, more particularly polyethylene, are preferred. Suitable YZ compounds include the polyhalogenated saturated aliphatic hydrocarbons exemplified by carbon tetrabromide, carbon tetrachloride, chloroform, trichloroethane, tetrachloroethane, tetrachloropropane and mixtures thereof, mercaptans such as ethyl mercaptan, butyl mercaptan, etc., a phosphorus trihalide such as phosphorus trichloride etc., or organic phosphites such as an alkyl phosphite containing from 1 to 4 carbon atoms, for example, ethyl dihydrogen phosphite, diethyl hydrogen phosphite, triethyl phosphite, etc., the halogens and hydrogen halides such as hydrogen chloride, hydrogen bromide, etc., halogenated saturated aliphatic monocarboxylic acids containing from 1 to 4 carbon atoms such as chloroacetic acid, bromoacetic acid, etc., and alkyl esters thereof wherein the alkyl group in each instance contains from 1 to 4 carbon atoms such as ethyl chloroacetate, ethyl bromoacetate, etc., acyl halides of saturated, aliphatic monocarboxylic acids containing from 2 to 4 carbon atoms such as acetyl chloride, propionyl chloride, etc., alkali metal bisulfites such as sodium hydrogen sulfite, potassium hydrogen sulfite, etc., saturated nitriles, and the like. Suitable catalysts include peroxides such as, for example, benzoyl peroxide, acetyl peroxide, lauroyl peroxide, di-tertiary butyl peroxide, resin peroxygen, etc.

The following table lists a number of reaction products prepared in accordance with the preferred process of our invention wherein a peroxide type catalyst is employed from, for example, thermally degraded polyethylene and various YZ compounds.

TABLE

| Vinyl Hydrocarbon | YZ Compound | Catalyst | Reaction Product |
|---|---|---|---|
| $RCH=CH_2$ | $CHCl_3$ | Lauroyl peroxide | $RCH_2CH_2CCl_3$ |
| $RCH=CH_2$ | $CHBrCl_2$ | do | $RCH(Br)CH_2CHCl_2$ |
| $RCH=CH_2$ | $BrCH_2CO_2C_2H_5$ | do | $RCH(Br)CH_2CH_2CO_2C_2H_5$ |
| $RCH=CH_2$ | $PCl_3$ | Resin peroxygen | $RCH(Cl)CH_2PCl_2$ |
| $RCH=CH_2$ | $(C_2H_5)_2PO(H)$ | Di-tertiary butyl peroxide | $RCH_2CH_2PO(OC_2H_5)_2$ |
| $RCH=CH_2$ | $HSO_3Na$ | Benzoyl peroxide | $RCH_2CH_2SO_3Na$ |
| $RCH=CH_2$ | $(CH_3)_2CBr$ —— $CO_2C_2H_5$ | Lauroyl peroxide | $RCH(Br)CH_2C(CH_3)_2CO_2C_2H_5$ |
| $RCH=CH_2$ | $CH_3COCl$ | Acetyl peroxide | $RCH(Cl)OCCH_3$ |
| $RCH=CH_2$ | $H_3PO_4$ | do | $RCH_2CH_2OPO(OH)_2$ |

The following examples will serve to illustrate further the products of our invention and the manner of their preparation.

Example 1

200 g. (equivalent to approximately 7 moles of ethylene) of polyethylene having a molecular weight of 21,000, 139 g. (approximately 1 mol.) of bromoacetic acid and 2 g. of tertiary butyl peroxide were mixed and heated at 145°–360° C. and 70 mm. pressure. The reaction temperature was gradually increased over a period of 3 hours from 145 to 360° C. as the bromoacetic acid combined with the olefinic hydrocarbon degradation products which formed from the polyethylene resin. At the end of this time, the mixture was evacuated to 2 mm. pressure and unchanged bromoacetic acid was distilled off. The final product had an average molecular weight of 1600 and contained 4.8% by weight of bromine. This value corresponds to approximately one bromoacetic acid molecule per hydrocarbon chain.

Example 2

100 g. (equivalent to approximately 3.6 mol. of ethylene) of polyethylene resin having a molecular weight of 19,000, 70 g. (approximately 0.6 mol.) of diethyl hydrogen phosphite and 2 g. of lauroyl peroxide were heated and refluxed at 170° C. As the diethyl hydrogen phosphite reacted with the olefinic hydrocarbon produced by the degradation of the polyethylene, the reaction temperature was raised to 300° C. and completed in 4 hours at that point. The final product was a hard, white wax with an average molecular weight of about 2600 and an acid number of 103, and it was 100% emulsifiable and formed self-polishing films. The wax product analyzed 1.39% by weight of phosphorus.

Example 3

200 g. of resin grade polyethylene (equivalent to approximately 7 mol. of ethylene) having a molecular weight of about 21,000, 20 g. (approx. 0.19 mol.) of sodium hydrogen sulfite and 3 g. of benzoyl peroxide were heated and stirred at 250° C. for 8 hours. The final product was a soft, white powder having an average molecular weight of 463. This product was soluble in water and possessed excellent cleansing properties for textiles and other fibrous materials.

Example 4

300 g. of polyethylene (equivalent to approximately 10.7 mol. of ethylene) having a molecular weight of 21,000, 40 g. (approximately 0.38 mol.) of sodium hydrogen sulfite and 2 g. of tertiary butyl peroxide were autoclaved at 290° C. for 4 hours. The product obtained was extracted with hot cumene to remove polyethylene residues. The yield of sodium alkyl sulfonate was 261 g. The product had an average molecular weight of 812 and had good detergent and emulsification properties. Analysis for sulfur indicated that the product contained approximately one molecule of sodium acid sulfite hydrocarbon chain.

Example 5

200 g. of polyethylene (equivalent to approximately 7 mol. of ethylene) having a molecular weight of 21,000, 50 g. (approximately 0.15 mol.) of carbon tetrabromide and 5 g. of tertiary butyl peroxide were heated to 300° C. in 2 hours. The reaction mixture was stirred vigorously and heated at 300° C.±10° C. for 4 hours. Unreacted carbon tetrabromide and by-product tertiary butyl alcohol were distilled out at 2 mm. pressure. The molten residue was poured into methanol, filtered and dried. Analysis of the product showed it to have an average molecular weight of 856, and the empirical formula $C_{38}H_{70}Br_4$. Hydrolysis and dehydration of the product gave an unsaturated monocarboxylic acid with an equivalent weight of 549 compared with calculated theory of 561.

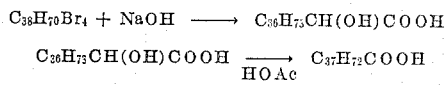

This result indicated that the molecular weight distribution falls in a relatively narrow range.

Example 6

200 g. of polyethylene (equivalent to approximately 7 mol. of ethylene) having 19,000 and 40 g. (approximately 0.24 mol.) of triethyl phosphite were autoclaved at 380° C. for 2.5 hours. The product was precipitated in methanol and dried. The hard, white wax product had the properties: M. W. 3900, density 0.942, acid number 29.2, iodine number 9.3, saponification number 4.24 and a phosphorus content of 2.04% by weight. This wax was 100% emulsifiable and gave self-polishing films.

Other products of generally similar properties and uses can also be prepared by following the procedures set forth in the above examples. Thus, copolymers of ethylene with any of the mentioned comonomers can be substituted for the polyethylene in the examples.

What I claim is:

1. A process for preparing addition products of an alkyl phosphite and the degradation products of a resinous, high molecular weight polyethylene which comprises heating at from 150° to 400° C., in the presence of an organic peroxide catalyst, a mixture comprising from 5 to 50 mole equivalents of the said polyethylene, calculated as moles of combined ethylene, to each mole of the said alkyl phosphite wherein the alkyl group contains from 1 to 4 carbon atoms, until the mixture of addition products which forms has an average molecular weight of from 200 to 4000.

2. A process for preparing addition products of diethyl phosphite and the degradation products of a resinous, high molecular weight polyethylene which comprises heating at from 270° to 400° C., in the presence of an organic peroxide catalyst, a mixture comprising approximately 3.6 mole equivalents of the said polyethylene, calculated as moles of combined ethylene, to each mole of the said diethyl phosphite, until the mixture of addition products which forms has an average molecular weight of approximately 2600.

3. A process for preparing addition products of triethyl phosphite and the degradation products of a resinous, high molecular weight polyethylene which comprises heating at 270° to 400° C., in the presence of an organic peroxide catalyst, a mixture comprising approximately 7 mole equivalents of the said polyethylene, calculated as moles of combined ethylene, to each mole of the said triethyl phosphite, until the mixture of addition products which forms has an average molecular weight of approximately 3900.

4. The mixed product obtained by the process of claim 2.

5. The mixed product obtained by the process of claim 3.

6. A process for preparing addition products of diethyl phosphite and the degradation products of a resinous, high molecular weight polyethylene which comprises heating at from 150° to 400° C., in the presence of an organic peroxide catalyst, a mixture comprising from 5 to 50 mole equivalents of the said polyethylene, calculated as moles of combined ethylene, to each mole of the said diethyl phosphite, until the mixture of addition products which forms has an average molecular weight of from 200 to 4000.

7. A process for preparing addition products of triethyl phosphite and the degradation products of a resinous, high molecular weight polyethylene which comprises heating at from 150° to 400° C., in the presence of an organic peroxide catalyst, a mixture comprising from 5 to 50 mole equivalents of the said polyethylene, calculated as moles of combined ethylene, to each mole of the said triethyl phosphite, until the mixture of addition products which forms has an average molecular weight of from 200 to 4000.

8. The mixed product obtained by the process of claim 1.

9. The mixed product obtained by the process of claim 6.

10. The mixed product obtained by the process of claim 7.

References Cited in the file of this patent

FOREIGN PATENTS 581,279    Great Britain _____ Oct. 7, 1946